United States Patent [19]

Smith

[11] Patent Number: 5,065,829

[45] Date of Patent: Nov. 19, 1991

[54] HYDRAULIC CONTROL SYSTEM FOR WEIGHING

[75] Inventor: Ronald Smith, Narrabeen, Australia

[73] Assignee: Wray-Tech Instruments, Inc., Downers Grove, Ill.

[21] Appl. No.: 614,869

[22] Filed: Nov. 16, 1990

Related U.S. Application Data

[62] Division of Ser. No. 488,679, Mar. 5, 1990, Pat. No. 5,065,828.

[51] Int. Cl.$^5$ .................... G01G 19/08; G01G 19/10; G01G 5/04; G01G 13/00
[52] U.S. Cl. .................................. 177/139; 177/141; 177/208; 414/21
[58] Field of Search ............... 177/139, 141, 145, 208, 177/209, 254

[56] References Cited

U.S. PATENT DOCUMENTS

| | | |
|---|---|---|
| 2,757,923 | 8/1956 | Lefsheik . |
| 2,851,171 | 9/1958 | Martin et al. ........................ 177/139 |
| 3,063,576 | 11/1962 | Hofmeister . |
| 3,290,931 | 12/1966 | Fowkes et al. . |
| 3,321,035 | 5/1967 | Tarpley . |
| 3,612,490 | 6/1969 | Bopp et al. . |
| 3,659,665 | 5/1972 | Godwin et al. . |
| 3,827,514 | 8/1974 | Bradley . |
| 3,910,364 | 10/1975 | Baker . |
| 4,281,729 | 8/1981 | Farley et al. . |
| 4,645,018 | 2/1987 | Garbade et al. . |
| 4,714,122 | 12/1987 | Appleton et al. . |
| 4,854,406 | 8/1989 | Appleton et al. ................ 177/145 X |
| 5,004,392 | 4/1991 | Naab ................................ 177/139 X |

Primary Examiner—George H. Miller, Jr.
Attorney, Agent, or Firm—Lee, Mann, Smith, McWilliams & Sweeney

[57] ABSTRACT

An hydraulic bypass control system for tapping off the lift circuit of an hydraulically operated lifting device. The bypass control system slowly releases hydraulic fluid from the lift circuit and directs it back to the reservoir in a controlled manner so a load is smoothly moved from a reference position to a weighing position. Reliable weighing may be obtained by avoiding dynamic shaking, vibration and pressure surges, which permits the weighing step to be reliably made at the same point or range and affords precise calibration of a load transducer with a weighing instrument to be made.

6 Claims, 4 Drawing Sheets

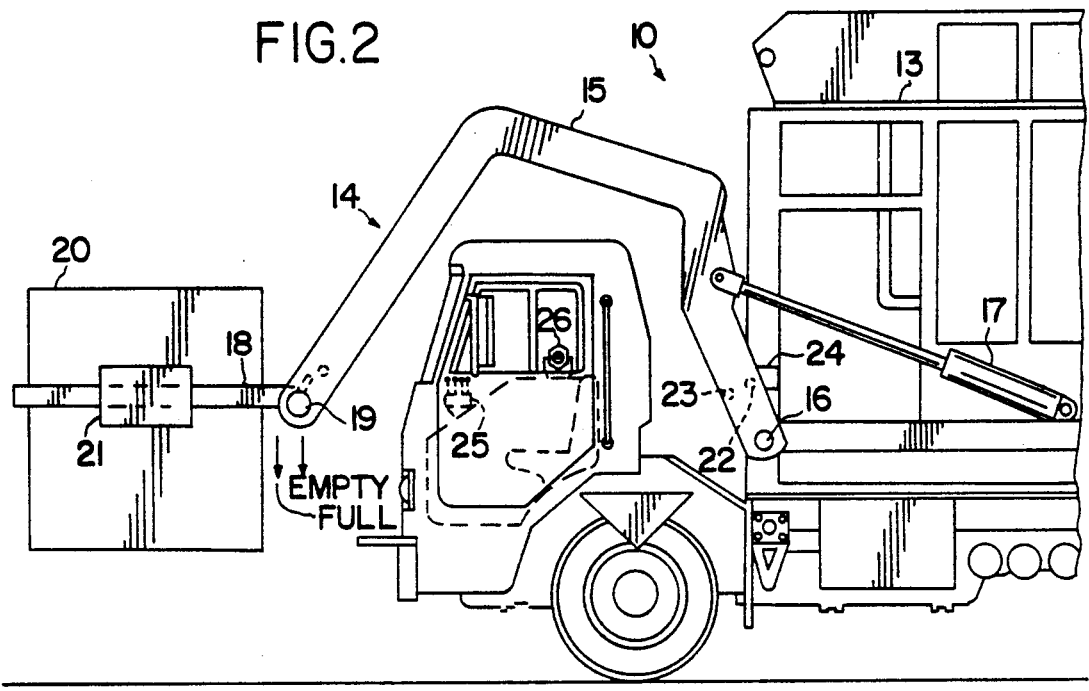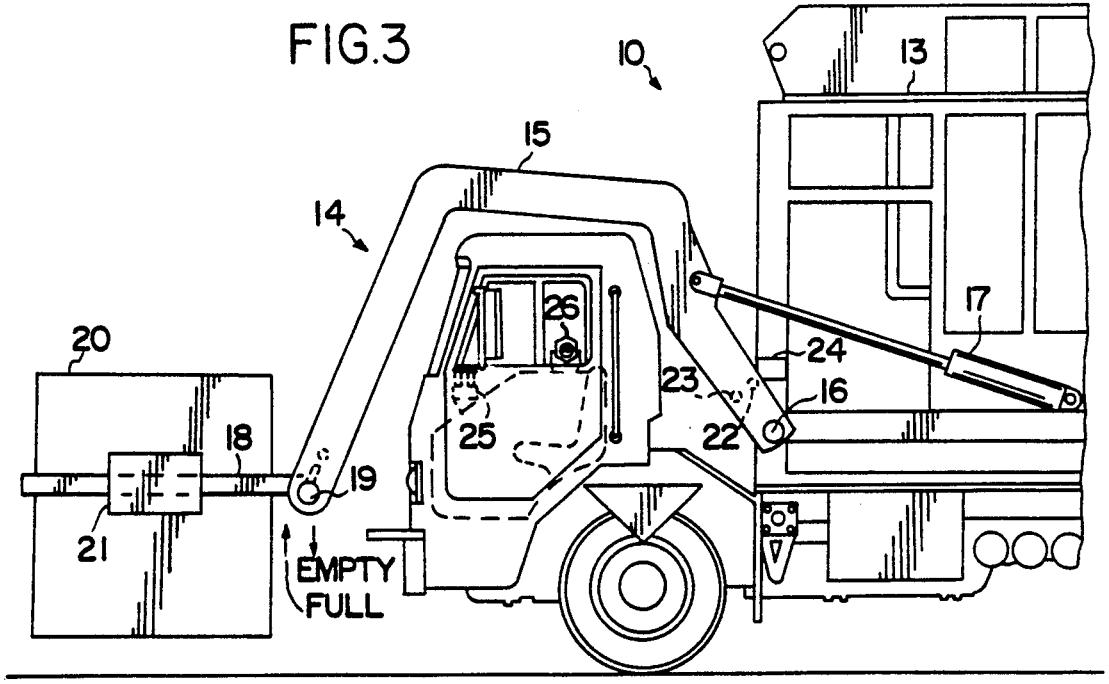

HYDRAULIC CONTROL SYSTEM FOR WEIGHING

This application is a division of Ser. No. 07/488,679, filed Mar. 5, 1990, now U.S. Pat. No. 5,065,828.

BACKGROUND OF THE INVENTION

The invention is generally directed toward weighing refuse collected by a refuse collecting vehicle. The invention is more particularly directed toward statically or dynamically obtaining the accurate weight of refuse loaded by hydraulically driven lifting arms of a refuse collection vehicle. The invention is further focused on the utilization of an hydraulic bypass system for controlling the movement of the arms of an hydraulic lift system of a refuse vehicle through a defined measuring range whereby a microprocessor converts electrical analog input signals from a transducer and digitally converts the input to serially total tare weights over time.

The immediate concerns of society include the need for effectively treating and disposing refuse of all kinds, including solid municipal waste, particularly for landfill burial. Refuse haulers are usually contracted to collect refuse containers from commercial, factory and other business sites on a regular basis. When the containers are due for collection, the refuse vehicle engages the container and dumps it into a receptacle that is part of the vehicle. In order for scavenger or waste hauling companies to dump loads at landfills, a per ton charge is typically assessed. While in the more crowded areas of the country, charges at the rate of $130.00 per ton are not uncommon, they usually fall in the range of about $30.00 to about $40.00 per ton. These charges and others are borne by the customer and the waster hauler will add an incremental amount more as profit. Therefore it is critical to both the customer and the hauler to know what amount is charged for the refuse and waste landfill fees.

It is difficult to estimate costs when different amounts might be collected from a customer on an ongoing basis. The volume and weight of refuse discarded may vary from week to week in a wide range, particularly for industrial plants where waste might vary from metal or wood to light plastics. Also, in bidding on jobs, a waste hauler might estimate too high or low. Estimating purely on the basis of volume is illogical because the charges for dumping at a landfill are made on a per ton basis. Thus the customer might be paying too much or too little depending upon its particular business and how the waste hauler sets its charges. These problems have been variously addressed in the prior art and proposed solutions usually involve weighing a container picked up by refuse vehicle when it is full and then when it is empty.

Typical refuse collection vehicles are usually of the type that have either a front loading or a rear loading set of hydraulic arms that are joined to extending engagement arms for engagement with engageable sleeve-like portions of the containers. The pivotal lifting arms are usually in the shape of a large downward yoke or U-shape and two such arms typically pivotally straddle the front of the cab or the rear of the refuse vehicle.

Hydraulic lift cylinders may either pull or push the arms during lifting depending upon the mechanism. The engagement arms are aligned with the engageable portions of the container and the refuse vehicle operator positions the vehicle while at the same time working the hydraulic system to engage the container. Then, the lift arms are drivingly pivoted and the container is lifted and leveled as it travels upwardly to be ultimately dumped into the receptacle of the vehicle.

Typical weighing procedures involve the use of load cells or transducers providing analog electrical signals proportionate to the loading sensed. The signals are converted by an analog/digital converter and may be tabulated and stored by a microprocessor.

The utilization of transducers in the form of load cells is shown in U.S. Pat. No. 4,714,122 wherein the transducer is mounted on the lifting element of a refuse truck. The signal is generated when the container is at a certain point relative to the truck body by virtue of a sensing switch activated by a cam surface on the lifting arms. However, load cells have been found to be unreliable and are easily damaged. The dynamics in lifting heavy weights creates significant vibration, stuttering and unsteadiness as the lift arms in the powerful hydraulic systems of a refuse vehicle are operated. Waiting for vibration and shaking to stop in order to make an accurate weighing wastes costly minutes, even for static measurements. Accuracy is naturally more difficult should dynamic weighing be attempted as the load is in motion.

Another use of load cells as found in U.S. Pat. No. 4,645,018, wherein the gross weight and the empty weight of the container are determined while the container is being emptied. A strain gauge (load cell) sets in a sliding body that is arranged with the lifting arms so that the sliding body will transmit the value of the weight of the refuse container to the load cell while it is displaced downwardly. The locking device is to be released and the dead weight of the container is measured by the load cell at the empty position. The signals for the individual full and empty weights are electrically communicated to a data recording unit.

Other related hydraulically operated machines have been required to accurately measure various materials to be loaded and carried, such as in U.S. Pat. No. 2,851,171 directed towards a material handling vehicle with a pivotable front loading bucket. An hydraulic pressure responsive gauge is provided in the hydraulic system of this device and is calibrated in units of weight. In that device the gauge is connected in an hydraulic series circuit with an hydraulic pressure snubber and gauged control valve. The gauge being in the hydraulic series with the lifting cylinder for the bucket. An analog-to-digital conversion employing a transducer, or the like, is not provided. A pressure gauge is difficult to keep calibrated and often is subjected to damage and inaccuracy during changeable weather conditions. The operation of this prior art system creates vibration and instantaneous hydraulic pressure surges so that a snubber is provided to dampen the effect, but requires a long time period to effectively dampen and is not highly accurate. Such devices do not teach utilization in an hydraulic system accommodating a microprocessor for tabulating over time the tare weights of a series of loads.

Systems for lowering loads onto a scale are known, such as in U.S. Pat. No. 3,612,490 where a skip loader is lowered by means of controlling the flow of hydraulic fluid from the lower end of an hydraulic cylinder while the loader is being lowered onto the weigh scale. An accurate measurement of loading in an hydraulic refuse container lifting system is not provided and weighing in this patent is independent of any hydraulic pressures.

A weighing system that provides for both dynamic and static weighing that controls the ascent and descent of lifting arms, or container-engageable lifting means, is not shown or suggested by the previous weighing systems.

It is accordingly a primary goal of this invention to provide for the accurate weighing of full and empty refuse containers by eliminating the vibration, pressure fluctuations, pressure surges and random shaking encountered in lifting heavy waste and refuse container loads.

It is another important goal of the invention to provide for a controlled weighing step in the lifting and dumping of a refuse container whereby sensed gross and empty weight values may be electrically signalled to a microprocessor wherein the tare weight may be calculated and serially tabulated during the course of the daily operation of a refuse vehicle.

It is another important objective of the invention to eliminate the problems with load cells and strain gauges previously used at the mechanical arms of refuse lifting devices and instead implement a separate hydraulic bypass system to the main hydraulic system, which is fluidly associated with the lifting circuit of the main system, whereby accurate calibrated readings may be made.

It is a further goal of the invention to provide for a controlling hydraulic bypass circuit that permits both manual and automatic weighing in conjunction with an analog/digital converting and microprocessing system.

It is yet another critical goal of the invention to provide a system for controlling the movement of a lift arm whereby accurate weights may be sensed by a transducer during both static or dynamic weighing modes, depending on the software program used, whereby to be usable with microprocessors having either or both capabilities.

It is an allied goal of the invention to overcome the imprecision found in dynamic weighing systems in the prior art by means of making possible the accurate calibration of a transducer by virtue of controlling over a limited path of motion the ascent or descent of the lifting arm assembly of a refuse collection vehicle.

It is yet another object of the invention to implement a transducer in a bypass hydraulic circuit which may be calibrated for different weight ranges, and types of refuse containers, in conjunction with a microprocessor that has numerous scales for the different ranges.

It is concomitantly a critical goal to provide for a weighing system that is reliable during the course of daily loadings and of dumping containers into a refuse vehicle, which involves severe dynamic impacts, variable loading, extreme weather conditions and human error in positioning the container.

It is an ultimate goal of the invention to provide for a weighing system that may be usable by lift cylinders that operate lift arms either by pushing or pulling them to pivot the lift arms during collection.

SUMMARY OF THE INVENTION

The invention may be summarized as comprising a bypass system bypassing the lift circuit of the hydraulic lift cylinder of a refuse vehicle. The bypass system including a flow rate control valve, a remote control valve, preferably operated by a solenoid and switch assembly controlled either by the vehicle driver, or automatically by means of a microprocessor, and further including a transducer providing an analog electric signal in response to pressures developed in the bypass circuit from the lift circuit. The pressures developed and signalled by the transducer are previously calibrated in the microprocessor to correspond to the weight lifted.

The system further includes proximity switch means and switch activator means, preferably in the form of striker pins, on the lift arms at reference and weighing locations so that the proximity switch is activated to cause a signal to the driver when the lift arms are at either position. Upon engaging a refuse container, the lift arms of the vehicle are moved upwardly through a first or weighing position whereby the proximity switch may, for example, cause a signal light to momentarily illuminate as the arms move past the first position to a second or reference position, where the proximity switch is again activated to re-illuminate the signal light. The operator then switches on the remote control solenoid valve of the bypass system. The control valve slowly taps-off hydraulic fluid under pressure from the lift circuit to release it to a reservoir and in a controlled manner causes the lift arms and held container to move downwardly until the proximity switch is and then re-activated when the load returns to the first, or weighing position. Upon seeing the signal light illuminated again, the operator releases the switch and the control valve is closed. The now steadily-held container is statically weighed by means of the transducer generating an analog signal corresponding to the pressure value to the microprocessor or weighing instrument. Alternately, the load may be dynamically weighed during the end portion of the controlled downward travel with a microprocessor software program that stores and converts to a digital readout the transducer signals over a period of time, usually about one-half second is sufficient. The controlled manner of movement obtained by the bypass circuit system and control valve steadies the load over this range and eliminates the hydraulic surges and variations, mechanical wobbling, equipment vibration, and other dynamic factors that have created unreliability in previous measuring systems. The system will be understood to be useful not only for refuse collection equipment, but a variety of hydraulic lifting devices including log stackers, forklifts, bulldozer, end loaders, power shovels, and the like.

BRIEF DESCRIPTION OF THE DRAWINGS

In the drawings, consisting of FIGS. 1-6, like reference numerals are used throughout to refer to the same elements wherein:

FIG. 2 is the refuse vehicle of FIG. 1 showing the lift arm assembly holding the container in an upper or reference position;

FIG. 3 shows the refuse vehicle after the lift arm assembly has lowered the refuse container to a lower or weighing position for weighing the container either empty or full depending upon the stage of the operation;

DETAILED DESCRIPTION OF THE INVENTION

To understand the apparatus and weighing process of the invention, the Figures will be explained with reference to the illustrated apparatus and process, which can provide optional forms making it possible for an operator to either manually or automatically control the lifting and emptying of a refuse container, and control the signalling to a microprocessor to serially weigh repeated gross and empty weights in order to sum tare weights as the workday goes on. At the end of the day, the microprocessing system can tabulate to total weights collected and also may connect to a printer to provide a printout billing record. Software programs to execute these functions are available.

The drawings show a refuse vehicle 10 in one known form of a motorized refuse collection vehicle for purposes of explaining the invention. The vehicle 10 is a front loading type vehicle with hydraulically operated lifting apparatus for seizing, holding, lifting and dumping a refuse container. A wide range of collection and lifting devices may be utilized with the invention, including stationary hydraulic lifting equipment wherein a container is brought to the lifting apparatus at a collection site instead of a vehicle going to the container. The present invention is useful for those lifting devices utilizing hydraulic lift systems.

The invention is directed toward tapping off a lift circuit for a lift cylinder of the vehicle 10. The system will be understood in greater detail with later reference to the schematic illustrations in FIGS. 5 and 6.

Figure 1:
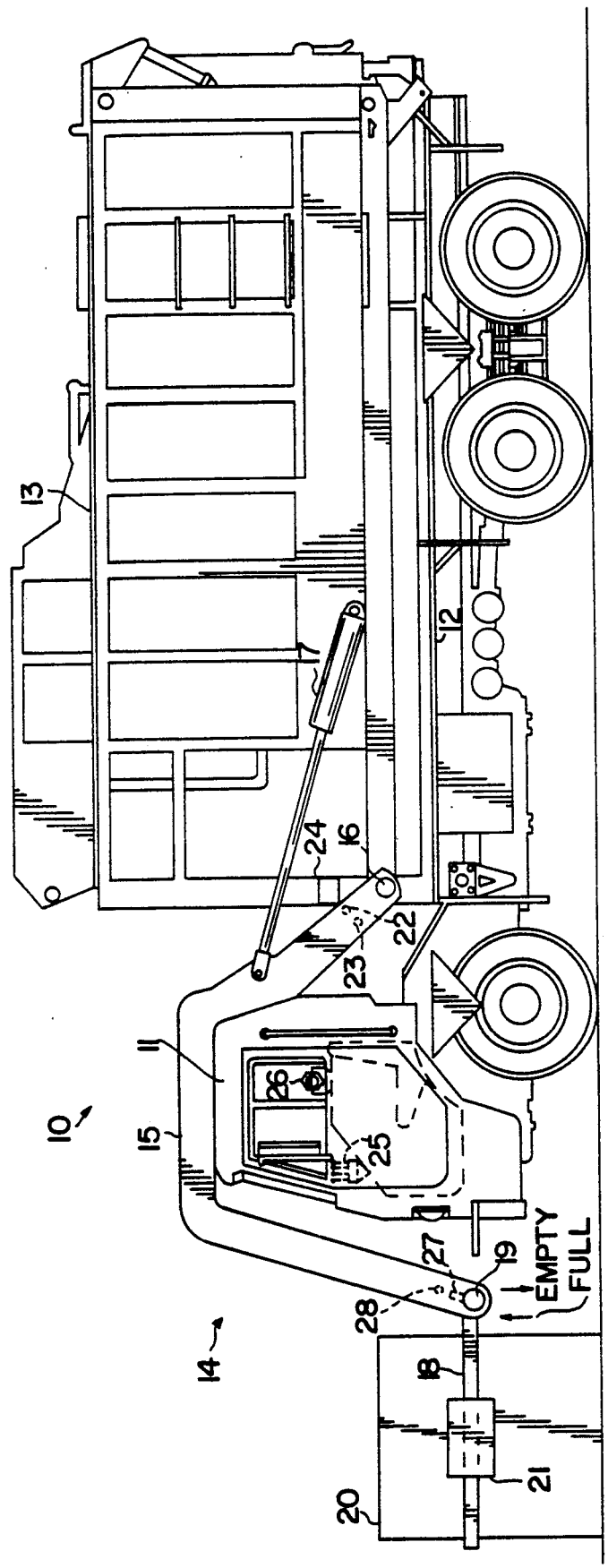
FIG. 1 is an elevational view of a refuse vehicle with a lift arm assembly engaging a refuse container resting on the ground.
Figure 4:
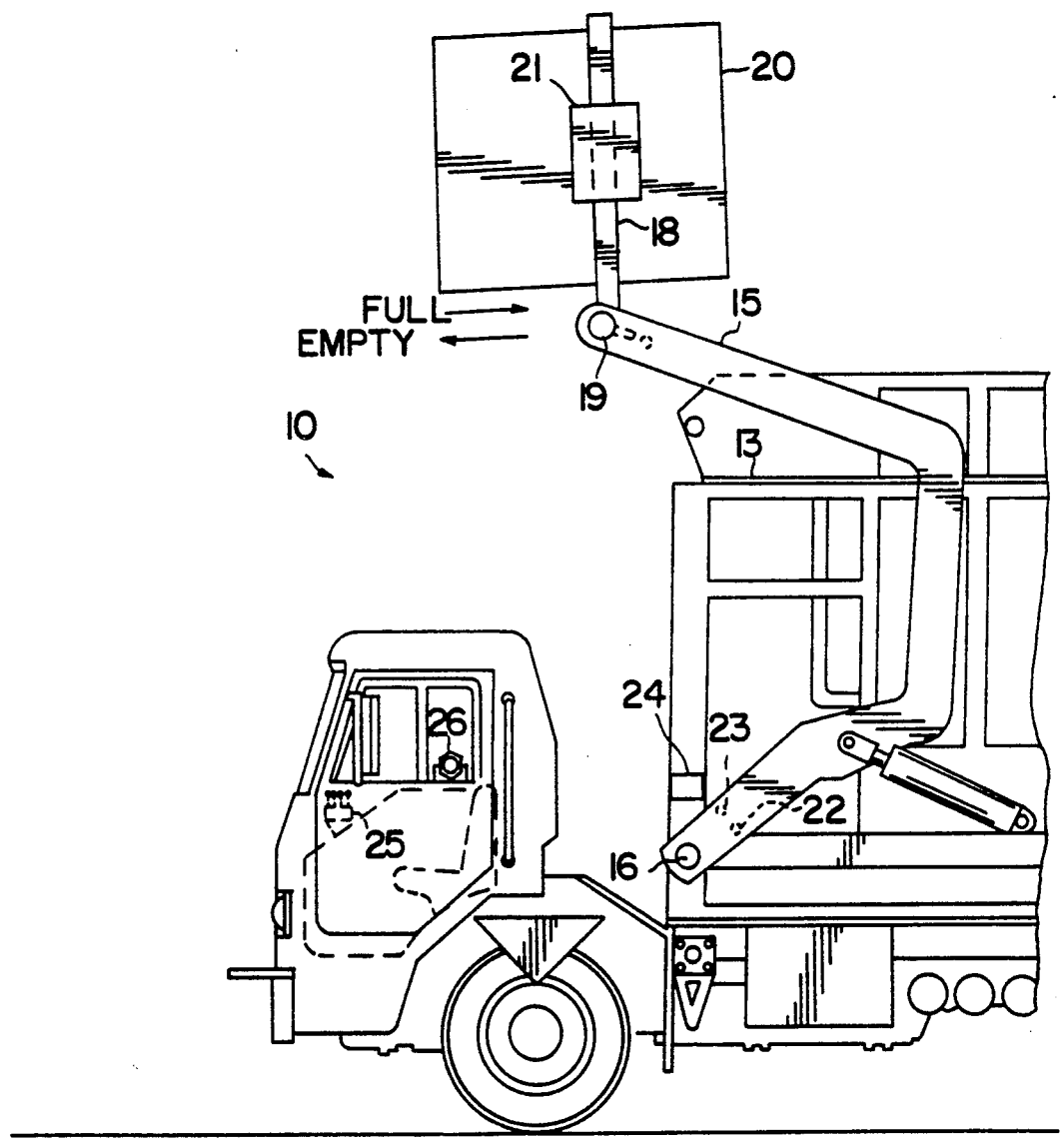
FIG. 4 illustrates the positioning of the lift arm assembly upon emptying the container into the receptacle following ascent from the lower position shown in FIG. 3.

It will further be understood that the vehicle 10 hydraulically pivots the lifting arms by pulling on them. Other mechanisms may be designed to push a lift arm about a pivot point and the choice is a matter of engineering particular to the apparatus designer. The present invention is usable for either type of system whether pulling or pushing against lift arms, but it is important to the present invention to tap-off from the lift circuit of the lift cylinder which is the hydraulic line that pumps from a fluid reservoir to the lift cylinder—not the return line of the lowering circuit. This is so that cylinder back pressure may be measured, which is a more accurate manner of measuring pressure. The vehicle 10 has a cab 11, bed 12 and collection bin or hopper 13 mounted on the bed 12. An hydraulically operated lift assembly 14 is arranged at the front of the vehicle 10 and has major components comprising conventional yoke-like inverted U or J-shaped lifting arms 15 hingedly arranged with the vehicle 10 at pivot pins 16 and pivotable by operation of lift cylinders 17. The lifting assembly 14 is engageable with refuse containers by means of separately pivotable engageable arms 18 which are pivoted on arms 15 at pivot pins 19. In FIG. 1, a refuse container 20 is engaged by the engageable arms 18 extending through a sleeve or slotted bracket 21 attached at the side of the container 20. As would be understood the FIGS. 1-4 show only the left side of the vehicle 10 and the right side is not shown since it would be substantially the same because the lift assembly 14 is generally symmetric.

Mounted on the interior side of the lift arm 15, and relatively close to the pivot pin 16 are two striker pins 22, 23 which are provided to be activator means for activating a magnetic proximity switch 24 at two elevations of the lift assembly 14 reached during the lifting and emptying of the container 20. A proximity switch 24 is needed only on one lift arm 15. To the left of FIG. 1, two directional arrows are shown for the sequenced movement of the container 20, which will be explained hereinafter.

The interior of the cab 11 is generally outlined in dashed lines and further includes a set of hydraulic control levers 25 for operating the hydraulic lift assembly 14. The weighing operation and calculation is obtained by means of a weighing instrument 26, which will be further explained in conjunction with the hydraulic control system of the invention as being an on-board microprocessor controlled digital instrument.

On a portion of the lift arm 15, near pivot pin 19, are orthogonally related leveling pins 27 and 28 which are visual indicators to the operator in the cab 11 to aid in leveling the container 20 during lifting by keeping them positioned in a certain way. The use of leveling pins is common practice in the industry. FIGS. 1–4 illustrate the arrangement of the refuse container 20 in four key positions during lifting, weighing and dumping. FIG. 1 is the position at which the refuse vehicle 10 first moves forward to engage the engageable arms 18 into the side sleeves 21. The container 10 is thus shown there resting on the ground, dock, warehouse floor, etc. The operator then activates the hydraulic system and causes lift cylinder 17 to pull on and pivot the lift arm 15 to lift the container 20 to the position shown in FIG. 2. As the container 20 is lifted the operator will usually level the container 20 at or slightly before reaching the reference position of FIG. 2. To reach the reference position in FIG. 2, strike pin 22 will have once activated the proximity switch 24 which would operate a signal light in the cab to go on and then switch off as the strike plate 22 moves past the proximity switch 24. Upon reaching the position in FIG. 2, strike pin 23 contacts the proximity switch 24 to coincide with the arrival of the container 10 at the reference level of FIG. 2 and the signal light in the cab is again illuminated to indicate to the operator that this position has been reached. Of course for manual operation other-type indicators can be used, such as an audible warning, video screen display, etc. In automatic operation, as will be discussed later, the proximity switch 24 may be directly wired to a weighing instrument or microprocessor.

Upon rising to the reference position, the inventive hydraulic control bypass system of the invention is engaged and the refuse container 20 is smoothly and steadily lowered to the weighing position shown in FIG. 3, at which point strike pin 22 contacts the proximity switch 24 to re-illuminate the signal light in the cab. This indicates to the operator it is time to disengage the hydraulic control bypass system. The gross weight is automatically captured and retained in memory by the weighing instrument 26 as will be explained hereinafter. The gross weight is captured by the instrument and next the operator re-engages the standard hydraulic controls 25 to lift the container 20 from the position in FIG. 3 continuously through the position of FIG. 2. The signal light in the cab would go off after leaving the position in FIG. 3 and then switch on and off as it passes through reference point of FIG. 2. Also, as the container moves through the reference point of FIG. 2 the weighing instrument 26 automatically arms itself in the tare mode and is ready to receive a transducer signal for weighing the empty container 20. The lift cylinder 17 ultimately pivots the lift arm 15 to bring the container 20 to the dumping position shown in FIG. 4. The refuse and waste materials are dumped into the hopper 13. When the container 20 is emptied, the operator activates the controls 25 to cause the hydraulic lift assembly 14 to move the container 20 downwardly until the striker pin 23 activates proximity switch 24 at the position in FIG. 2 to illuminate again the signal light in the cab. The descent is then stopped. The operator then will activate the hydraulic bypass control system, and the container is slowly lowered to the weigh position of FIG. 3. As it leaves the position of FIG. 2 the striker pin 23 moves out of contact with the proximity switch 24 and the signal light is off, until the refuse container 20 returns to the position of FIG. 3. At the weigh position the strike pin 22 activates the proximity switch 24 and illuminates the light to provide another weigh signal to the operator. Another transducer-generated analog signal from the hydraulic control bypass system is sent to the weighing instrument 26. The empty weight of the container is then captured. The microprocessor makes a tare weight calculation for the contents that were dumped into the receptacle 13 and the value is recorded, stored and tabulated for later retrieval, printout, and for invoicing the customer.

Therefore, for static weighing the weight is always captured at the location of the container 20 shown in FIG. 3 for both full and empty container weights. A continuing sequence of containers 20 all will descend in the same controlled steady manner from the reference position of FIG. 2 to the weighing position in FIG. 3 so that reliable weight values are recorded.

Figure 5:
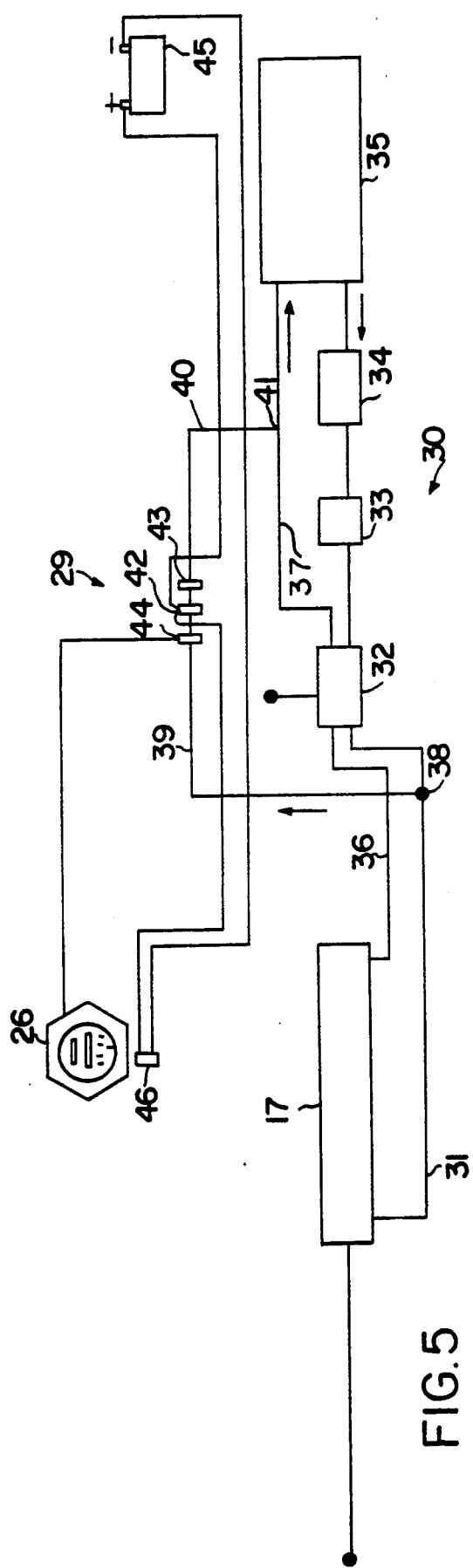
FIG. 5 is a schematic illustration of the electrical and hydraulic systems of the refuse vehicle including the inventive bypass and control valve circuit system for controlling the movement of the lift arm assembly; and, FIG. 6 is an enlarged drawing of the transducer, remote control valve and flow control valve of the bypass circuit system as shown in FIG. 5.
Figure 6:
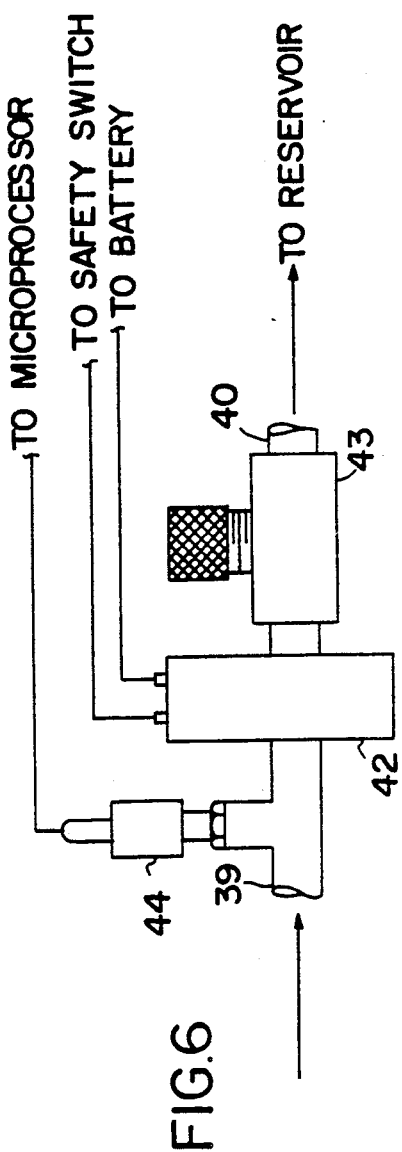

Turning now to FIGS. 5 and 6, the bypass control system of the invention is generally designated at reference numeral 29 and the standard hydraulic system for the lifting assembly 14 is generally designated at reference numeral 30. The bypass control system 29 taps into the hydraulic system 30 and controls the motion of the lift arm 15 for weighing full and empty containers 20. The hydraulic system 30 includes a lift circuit line 31 for driving the lift cylinder 17 under pressure. Flow through the lift circuit 31 is controlled by a manually controlled valve 32 that is operable by the operator from the cab at the controls 25. A relief valve 33 is interposed between the main control valve 32 and a pump 34 for pumping the hydraulic fluid through the system from a reservoir 35. For lowering the lift arm 15, fluid is retracted from the lift cylinder 17 through a lowering circuit 36 back through the main control valve 32 to a main return line 37 communicating with the reservoir 35. The bypass control system 29 taps-off the lift circuit 31 at 38 to a bypass line 39 and ultimately returns the fluid back to the reservoir 35 through a bypass return line 40 connected to the main return line 37 at 41. Creating flow through the bypass control system 29 is obtained by the operation of a normally closed remote control valve 42 that feeds to a normally open pre-set flow rate control valve 43. A transducer 44 resides along the bypass line 39 and responds to the pressure in the bypass line 39 to generate an analog electrical signal to the microprocessor of weighing instrument 26. In the illustrative embodiment, a 3000 psi rated hydraulic transducer is used. The remote control valve 42 is, in one form of the invention, a manually operated solenoid valve that is normally closed. It is energized by a switch in the cab that the operator activates upon receiving the light signal at the activation of the proximity switch 24 by the striker pin 23 at the reference position shown in FIG. 2. Electrical power for the remote control valve 42 is provided by the usual battery pack of the vehicle 10. A safety or "deadman's" switch 46 is operated by a battery 45.

When the container 20 reaches the reference position of FIG. 2, the operator activates the remote control valve 42 by depressing a switch to open the valve 42 and thereby hydraulic fluid is tapped-off the lift circuit line 31 at connection 38 to flow through the bypass line 39 and outwardly of the system 29 through bypass return line 40 in a controlled and relatively slow descent rate set at the flow rate control valve 43. The rate of descent is significantly slower and smoother than provided by the main control valve 32. Thereby, erratic pressure surges, rocking and dynamic thrusts on the container 20, are substantially eliminated so that during the descent from the reference position to the weighing position a very steady loading force is experienced by the lift arms 15. An even hydraulic flow in the lift circuit 31 is created and a steady pressure value, or rate, during descent is sensed by the transducer 44. In this way, the weighing instrument 26 may be precisely calibrated for different size containers and for pressures caused by different ranges of weight. The calibration is very reliable because subsequent actual container handling are always controlled in the same way in the descent from the reference point to the weighing point. By virtue of the signals caused by the proximity switch at those two locations, the lift arms 15 repeatedly are caused to move through substantially the same path and relative speed for each type of container 20. The weight is always captured at substantially the same position, resulting in accurate calculation of the net weights of the refuse material dumped to the receptacle 13.

One weighing instrument particularly suitable for use is made by Wray-Tech Instruments, Inc., Downers Grove, Ill., under model nos. WT4000/6000/8000. These are onboard microprocessor controlled digital weighing instruments.

To further explain the modes of operation of the bypass control system 29, it should be understood that as a load in the container 20 is raised, the pressure presented to the transducer 44 consists of contributions from fluid movement in the lift circuit 31, friction, the weights of the mechanical components of the lift assembly 14, and the weight of the load in container 20. In the manual mode of operation, the load is not weighed as it first passes through the weighing position of FIG. 3, but instead moves directly to stop at the reference position of FIG. 3, whereupon the proximity switch 24 is activated by the striker pin 23 to illuminate a signal light in the cab. Preferably just at or before rising to the reference position, the operator will level the container 20 so that for each load the same angle of inclination of the container is achieved. Then, the operator activates a switch to energize the normally closed remote control valve 42 to slowly bleed hydraulic fluid under pressure through the bypass line 39, the transducer 44 and back to the reservoir 35 until the proximity switch 24 goes off and then on again as it is re-activated by striker pin 22, so that the signal light is illuminated for the operator to stop the slowly descending container 20 at substantially the same point each time. The weighing instrument 26 automatically captures the weight. The bypass control system 29 is operable with a microprocessor whereby to be manually operable for both static and dynamic weighing. The difference between the static and dynamic procedures is mainly that the static weighing requires the load to be held for no more than about five seconds in the weighing position while the dynamic method captures the weight as it moves through the weighing position of FIG. 3 from the reference position of FIG. 2. Both static and dynamic weighing require the load to be lowered from the reference position to the weighing position. Commercially available software systems allow a microprocessor to be programmed either for static or dynamic weighing. In both static and dynamic weighing methods, the weighing instrument automatically arms itself to accept, capture and record gross and tare weights. The remote control valve 42, in the exemplary embodiment, is operated manually. In dynamic weighing, the weighing instrument 26 converts continuous analog signalling from the transducer to display a digital readout and a calculated weight value is finally stored upon reaching the weighing position. The weighing process of the invention centers on the controlled lowering of the load from the reference point to the weighing position, in either mode. For dynamic weighing, it is not required that the load be held in a position at FIG. 3 since a software program will calculate the weight at a set time sequenced after the container leaves the reference point, and in the described system is about a one half second time interval.

The main hydraulic system 30 is operated at controls 25 and has the ability to override the remote control valve 42 to initially lift the container 20 to the reference point.

The static weighing mode requires holding in the weighing position until the gross weight is accurately captured, usually about 3 to 4 seconds. In dynamic weighing the load is allowed to continue falling until the gross weight is captured, as stated above, about one half second when using the WT4000/6000/8000 microprocessor. The tare weighing by the weighing instrument 26 can also be automatically done by the reactivation of the proximity switch 24 as the container 20 is raised and dumped after the gross weight has been captured. Weighing in the automatic mode is then completed by moving the empty container 20 to the reference position and stopping there, whereupon the signal is generated by the striker pin 23 activating the proximity switch 24. The operator next activates the remote control valve 42 to allow the load to fall to the weighing position where the tare weight is automatically captured upon signalling caused by the re-activation of the proximity switch at the weigh position and the net weight is displayed on a digital display of the weighing instrument 26.

Provided that the components other than the load in the container 20 can be kept at the levels which exist at calibration, the pressure measured by the transducer 44 can accurately represent the weight of the load being lifted. In order to achieve this, the speed of the operation and the tilt of the engageable arms 18 relative to the container 20 must be controlled. An onboard microprocessor digital weighing instrument 26 such as the WT4000/6000/8000 model, will capture the weight of the load at the weighing position where the machine-generated pressure contributions are known.

Known microprocessing software can provide a variety of ways for accumulating the totals, such as per customer per day, or per month in printout form, as would be understood. Also, useful microprocessors for the invention preferably will have multiple scales for corresponding pressure calibrations of different size containers and loading ranges, so that fluid pressures involving different machinery-generated variations may be obtained for changeable load conditions. Multiple calibration scales are also necessary for enhanced accuracy due to different ways in which the engagement arms 18 might engage a variety of engageable sleeves or brackets of refuse containers.

Accordingly, a unique and efficient bypass control system is provided to accurately and reliably calculate the full and empty weight of a refuse container as it is loaded and emptied into a refuse collection vehicle, or the like.

While the foregoing description is provided in connection with one embodiment and several described alternative modes of use of the invention, it will be understood that a wide range of equivalents fall within the scope of the claims appended hereto.

What is claimed is:

1. A motion control method for generating reliable analog electrical signals from a pressure transducer means and providing analog signals responsive to hydraulic fluid pressure caused by lifting a weight by means of an hydraulic lift assembly of a refuse collection vehicle, said method comprising the steps of:
   tapping off hydraulic fluid under pressure from the lift circuit of an hydraulic lift assembly of a refuse collection vehicle;
   bypassing said tapped off hydraulic fluid through an hydraulic bypass circuit;
   lowering a weight lifted by the hydraulic lift assembly;
   directing said tapped-off hydraulic fluid to hydraulic pressure transducer means sensing the pressure in the hydraulic bypass circuit and generating an analog electrical signal corresponding to the weight being lowered by said hydraulic lift assembly;
   communicating said analog signal to an analog/digital converter means; and,
   creating a digital record of the weight.

2. The method as claimed in claim 1 wherein the step of generating of an analog electrical signal from said transducer means occurring dynamically while said hydraulic lift assembly lowers the weight.

3. The method according to claim 1 wherein said tapping off step is preceded by opening a normally closed valve in the hydraulic bypass circuit.

4. The method according to claim 3 including prior to the tapping off step, generating an electrical signal when a lifted weight is lifted to a reference position.

5. The method according to claim 1 wherein the generating of an analog electrical signal occurring as said weight is statically held by said hydraulic lift assembly.

6. A motion control method for generating reliable analog electrical signals from a pressure transducer means and providing analog signals responsive to hydraulic fluid pressure caused by lifting a weight by means of an hydraulic lift assembly of a refuse collection vehicle, said method comprising the steps of:
   opening a normally closed valve in an hydraulic bypass circuit;
   tapping off hydraulic fluid under pressure from the lift circuit of an hydraulic lift assembly of a refuse collection vehicle into said hydraulic bypass circuit;
   lowering a weight lifted by the hydraulic lift assembly;
   directing said tapped-off hydraulic fluid to hydraulic pressure transducer means and generating an analog electrical signal corresponding to the weight being lifted by said hydraulic lift assembly;
   communicating said analog signal to an analog/digital converter means; and,
   creating a digital record to the weight.

* * * * *